(12) United States Patent
Sharma

(10) Patent No.: US 12,010,211 B2
(45) Date of Patent: Jun. 11, 2024

(54) ENCRYPTING DATA UNITS WITH A MEMRISTOR ARRAY

(71) Applicant: HEWLETT PACKARD ENTERPRISE DEVELOPMENT LP, Houston, TX (US)

(72) Inventor: Amit S. Sharma, Milpitas, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 365 days.

(21) Appl. No.: 17/563,814

(22) Filed: Dec. 28, 2021

(65) Prior Publication Data
US 2023/0208612 A1 Jun. 29, 2023

(51) Int. Cl.
*H04L 9/06* (2006.01)

(52) U.S. Cl.
CPC .................. *H04L 9/0631* (2013.01)

(58) Field of Classification Search
CPC ...... H04L 9/0631; H04L 2209/12; G09C 1/00
USPC ......................................................... 380/28
See application file for complete search history.

(56) References Cited

U.S. PATENT DOCUMENTS

2020/0272340 A1* 8/2020 Kwok ................... G06F 3/0616

* cited by examiner

*Primary Examiner* — Lan Dai T Truong
(74) *Attorney, Agent, or Firm* — Sheppard Mullin Richter & Hampton LLP

(57) ABSTRACT

Systems and methods are provided for encrypting data in a memristor array. The data may be scrambled by multiplying an input data unit by another data unit, by multiplying each element of a first data unit by a different instance of a second data unit. The process continues until all elements of the first data unit are multiplied by a different instance of the second data unit. The elements of the data units may be represented by resistive values of a memristor array. The result of all of the above multiplication of different instances of the second data unit are a new set of data units. All of the resulting data units are added together by adding the currents associated with values of the memristors representing the resulting data units. The operation may be performed as a finite field computation, with the memristor array.

20 Claims, 14 Drawing Sheets

ENCRYPTING DATA UNITS WITH A MEMRISTOR ARRAY

BACKGROUND

Currently, Advanced Encryption Standard (AES) ciphers are implemented using a variety of logic and circuit design approaches. An AES cipher can refer to a block cipher, in particular, a symmetric block cipher that uses a key to encrypt and decrypt a block of messages. AES may also use a substitution permutation network (SPN) algorithm, where multiple rounds of encryption are performed. Data to be encrypted may be placed into an array. A transformation can be performed for the substitution of data using a substitution table. Another transformation can comprise shifting data rows. Yet another transformation can comprise column-mixing, performed on each column using a different part of an encryption key.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
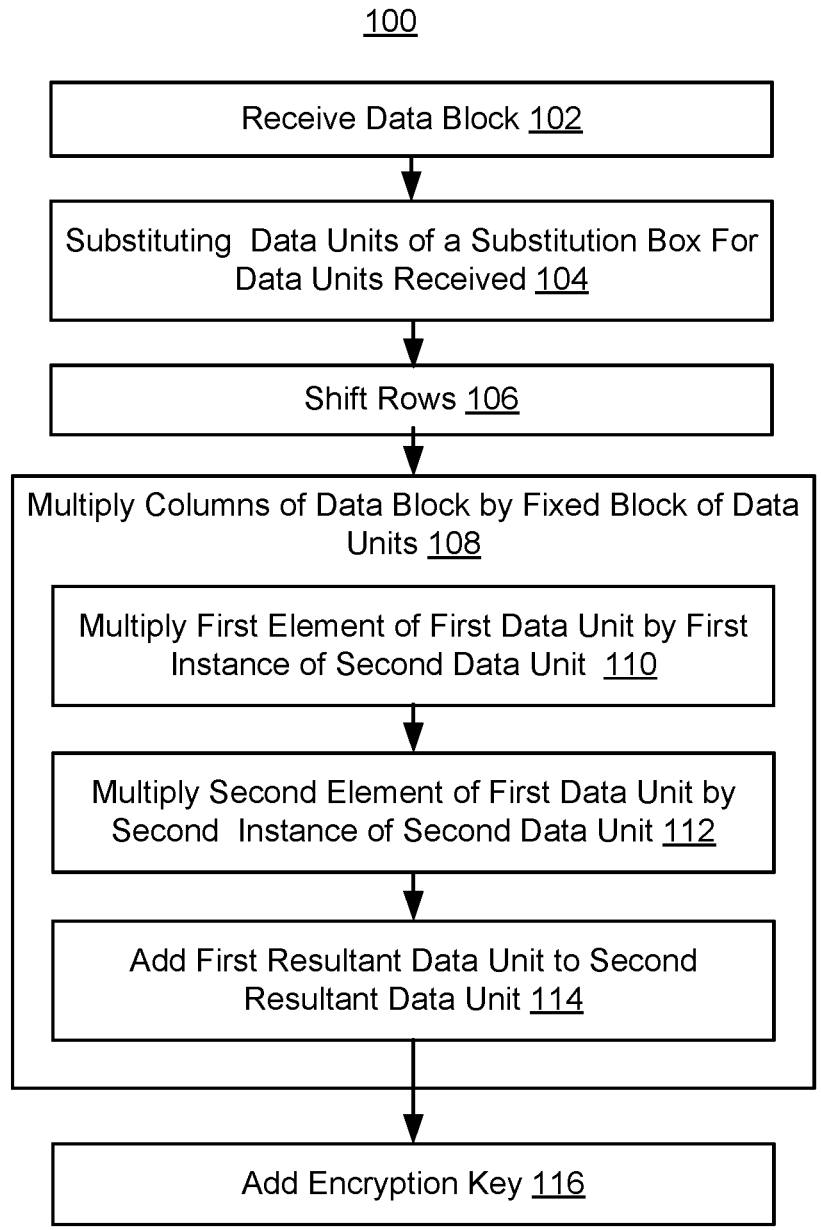
FIG. 1 illustrates a method of processing data with memristors.

The figures are not exhaustive and do not limit the present disclosure to the precise form disclosed.

DETAILED DESCRIPTION

Advanced Encryption Standard (AES) based encryption has become ubiquitous in the industry. Security as a service infrastructure may benefit from AES based encryption of data in transit/flight and data at rest within a tenant and an operator space. A security as a service (SECaaS) infrastructure may be used on-demand and may work on the principle of constraining or confining threats close to the point of origin, using hardware. Optionally, each user task (e.g., opening an email attachment) is placed into an isolated, hardware-enforced virtual machine (VM), which may optionally be a microVM. Placing tasks into isolated, hardware-enforced VMs prevents malware from escaping the task in which the task arrived, so that the malware cannot infect the rest of the system. When the process is completed, the microVM is destroyed, along with any malware. For example, microVMs can be used to perform data encryption in the following scenarios: encryption of tenant container images; encryption of operator firmware (FW) images; tenant ephemeral storage; tenant block storage; transport layer security (TLS)-based communication; virtual private cloud (VPC) isolation; artificial intelligence/machine learning (AI/ML) during transport; neural network weight encryption during transport; and encryption of data in main memory.

The encryption system disclosed, here, provides a high performance and efficient memristor based AES acceleration that has a wide variety of applications. Some applications include resistive random access memory (ReRAM) or memristor-based non-volatile memory within Von Neumann architectures, which may require encryption of data in-memory. Using memristors for performing encryption provides good performance, at low power. Memristors may be arranged in high density arrays, requiring relatively little space, compatible with smaller geometries. ReRAM or memristor-based hardware may also benefit from memristor based encryption.

Some examples of hardware that may benefit from memristor-based encryption include massive scale neural networks and neural network weights during transport. Also, dot product component (DPC) accelerators may need security protection when used for inference-type applications and training. Another example of such hardware may include business logic applied to an end user. Specifically, the current encryption system may use memristor-based storage and in-situ computation to achieve performance, power efficiency, and silicon area economy within very large-scale integration (VLSI) designs and implementations of AES. The current system may be applied to any device or system that requires encryption (e.g., based on AES). The current system may be applied within VLSI designs.

As noted above, an AES cipher may use several rounds of encryption. In each round of encryption, the cipher function may include the following main sublayers: byte substitution; row shift; column mix; and key addition.

In the byte substitution layer, one byte may be substituted for another, effectively encrypting the data via a first method of encryption. Each layer may receive input from a prior layer and may pass on its output to the next layer. Optionally, each layer may function without a dependence on the manner in which the prior layer performed an operation. During the row shift layer, rows of data are shifted a defined number of bits in a given direction (e.g., right or left). The defined number of bits may be zero to four bytes, depending on the row, for example. During the column mixing layer, the data within each column is scrambled on a per-column basis. During the key addition layer, a cryptographic key is added or mixed with the results of the prior three layers. A cryptographic key may include an encryption key and a decryption key, which may be the same key.

Depending upon the key size, several rounds of encryption may be used. For example, a 128 bit key may use 10 rounds, a 192 bit key may use 12 rounds, and a 256 bit key may use 14 rounds of encryption. The encryption may be performed using finite field computations. During the finite field computations, the number of symbols may be limited to a first specified number, and the number of elements that make up one data unit may be limited to another specified number. For example, an AES cipher includes a finite field having data units of 8 elements, which may each have one of two values or symbols (0 or 1), and is a Gladios Field classified as $2^8$ ($GF(2^8)$). In other words, the allowed operations are limited, or constructed so as to ensure that the result of the operation is another data unit that is also a part of the field. Consequently, the data unit that results from the operation has the same number of elements as the data units of the field and has no new symbols. In the $GF(2^8)$, the data unit 01001001 may be represented by the polynomial $x^6+x^3+1$. If two functions are elements of $GF(2^m)$, that is, if $$A(x), B(x) \in GF(2m),$$

then the sum of the two elements are then computed according to:

$$C(x)=A(x)+B(x); \text{ and consequently,}$$

$$c_i \equiv (a_i+b_i) \bmod 2, \text{ where}$$

$$C(x)=\Sigma_{i=0}^n c_i x^i.$$

Similarly, the difference may be computed according to $C(x)=A(x)-B(x)$, and consequently, $$c_i \equiv (a_i-b_i) \bmod 2 = (a_i+b_i) \bmod 2.$$

Specifically, modular 2 addition and modular 2 subtraction are both exclusive OR operations, which aids in limiting the results of the addition and subtraction of data units having elements of 1s and 0s to new data units also having values of 0s and 1s. The use of polynomials to represent a value of a data unit is a shorthand for representing a number that is generic to multiple bases. If in the above polynomials x=2, the value of the data unit is a base 2 number. Whereas, if x=10, the value is a base 10 number. The powers of the terms of the polynomial keep track of the power of the digit of the associated place of the number.

As an extension field, to limit the number of elements in a data unit, multiplication may be performed as follows, let $A(x), B(x) \in GF(2^m)$ and let $$C(x)=(A(x)B(x)) \bmod 1+x+x^3+x^4+x^8.$$

By performing the multiplication modular $1+x+x^3+x^4+x^8$ the resulting polynomial has no terms greater than $x^7$. For example, if $A(x)=1+x^3+x^7$ and $B(x)=1+x$, then, $$A(x)B(x)=(1+x^4+x^7)(1+x)=1+x+x^4+x^5+x^7+x^8.$$

Consequently, the modular product, $$A(x)B(x) \bmod 1+x+x^3+x^4+x^8=(1+x+x^4+x^5+x^7+x^8)-(1+x+x^3+x^4+x^8)=x^3+x^5+x^7.$$

In the above computation, since the addition and subtraction of polynomials are term-by-term exclusive OR operations, the terms of the resulting polynomial are the same as terms that are found in only one of the two polynomials being added or subtracted. The multiplications and additions performed during the encryption process scrambles or encrypts the data, by mixing the data with other values, or an encryption key.

Referring now to FIG. 1, a memristor array executes the operations (e.g., machine instructions) of method 100 to encrypt data.

In operation 102, a first data block is received as input to a memristor array. The first data block may include a first plurality of data units. Each data unit may have a different location within the first data block.

In operation 104, data units of a substitution box are substituted for the data units of the first data block to form a second data block. The locations of data units within the second data block are represented by locations of memristors within the memristor array. Storage medium 104 may include memristor arrays, which may be used for storing information and may be used for computing. The memristor array may be used for encrypting information.

In operation 106, locations of data units are shifted along the rows of the second data block by shifting positions of values stored by memristors to form a third data block.

In operation 108, each column of data units of the third data block is multiplied by a fixed data block to form a fourth data block. The fixed data block has data units of fixed values. The multiplying of each column of the data units of the third data block by the fixed data block may be performed by the following suboperations of operation 108.

In suboperation 110, a first element of a first data unit is multiplied by a first instance of a second data unit, resulting in a first resultant data unit. The first resultant data unit may be represented by a first set of memristors. The first element of the first data unit represents a multiple of a first power of a base value. One of the first data unit and the second data unit may be a data unit of the third block of data, and another of the first data unit and the second data unit may be a data unit of the fixed data block.

In suboperation 112, a second element of the first data unit is multiplied by a second instance of the second data unit, resulting in a second resultant data unit. The second data unit may be represented by a second set of memristors. The second element of the first data unit may represent a multiple of a second power of the base value. The first power and the second power are different from one another.

In suboperation 114, the first resultant data unit is added to the second resultant data unit by adding respective currents associated with the first and second sets of memristors.

In operation 116, values of an encryption key are added to the data units of the fourth data block by adding currents of memristors representing values of the encryption key with currents of memristors representing the data units of the fourth block (the conversion of the addition of currents to an exclusive OR operation is discussed below in FIG. 7).

Figure 2:
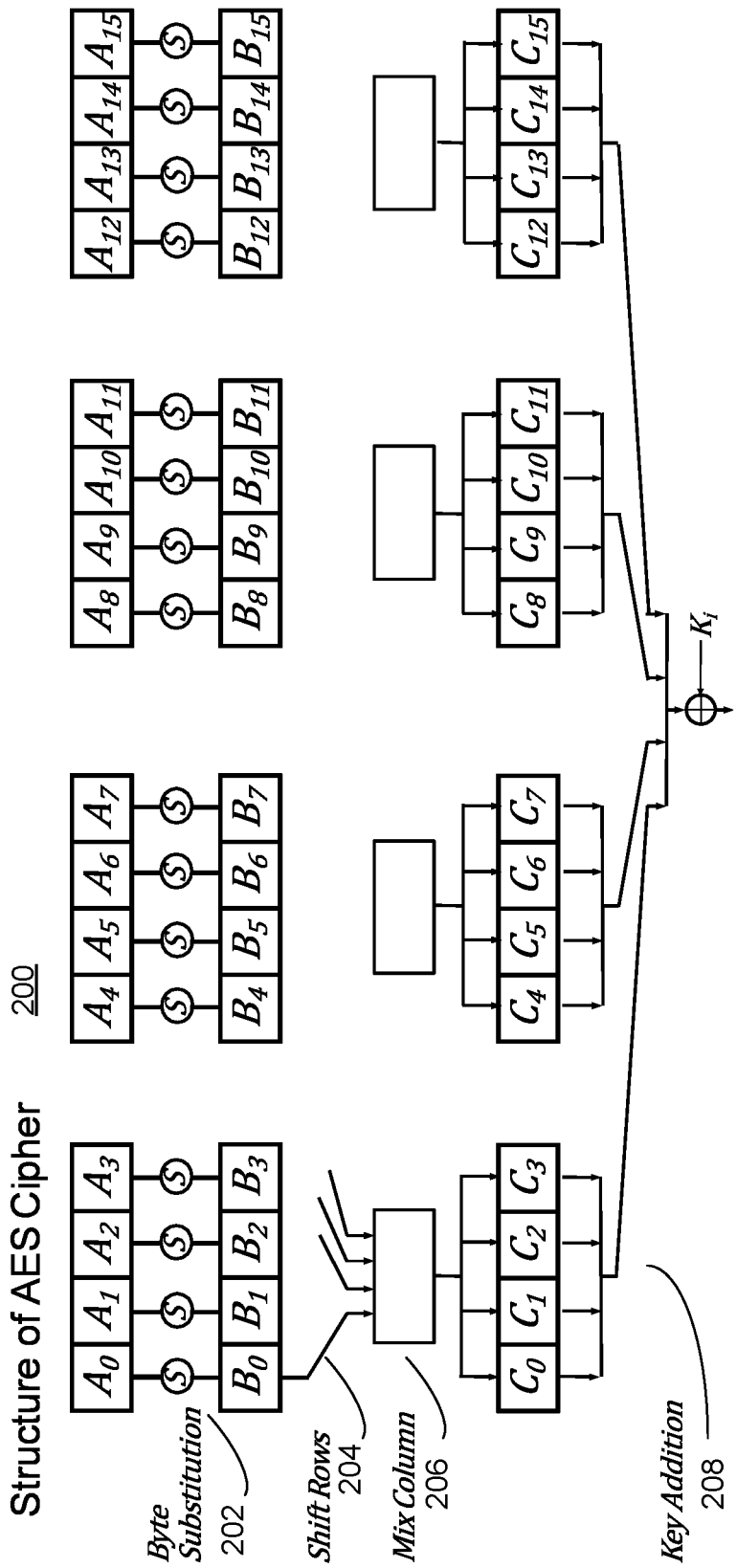
FIG. 2 illustrates a schematic diagram of an example of a structure of a cipher.

The operations of FIG. 1 are further elaborated upon in FIG. 2 and subsequent figures.

FIG. 2 illustrates a schematic diagram of structure of a cipher 200. The first block of data of operation 102 may be data units $A_0$-$A_{15}$. Each data unit may be a byte of data, for example. The first data block may be plaintext or a state data block, which has already undergone one or more rounds of encryption. The "states" of the system are arrays of intermediate values between an array representing plain text and the final encryption. The plain text may be the initial state and the fully encrypted messages may be the final state. For example, the input state and output state of the byte substitution may both be 4×4 arrays of data units. In the initial round, the key may be added to the data units representing the cipher text prior to performing substitution operation 202. In subsequent rounds, the input state to substitution operation 202 is the output of the last operation of the prior round.

In the example of FIG. 2, each group of 4 data units may be a column (or row) of the data block. Substitution operation 202 may be operation 104 of FIG. 1. During substitution operation 202, as indicated by FIG. 2, data unit $A_0$ is replaced with data unit $B_0$, data unit $A_1$ is replaced with data unit $B_1$, ... and data unit $A_{15}$ is replaced with data unit $B_{15}$. This may be performed by replacing each of input data units $A_0$-$A_{15}$, with another value that may be arrived at by a lookup table or by applying a transformation. Each input to the table has a unique output. Data units $B_0$-$B_{15}$ are the values in the table that correspond to data units $A_0$-$A_{15}$. Substitution operation 202 is analogous to replacing each symbol of the alphabet with a different symbol that is not part of the alphabet. The substitution box is discussed further, below, in conjunction with FIG. 3.

Shift rows operation 204 may be the result of executing instruction 106 of FIG. 1. During shift rows operation 204, the input and output states have the same data units, but in different locations. During the row shift the locations of the data units in the output array is determined by the shift applied to each row of data. For example, the first row may not be shifted at all. In the second row, each data unit may be shifted by one data-unit-position in the same row. For example, the last data unit of the second row of the input state may be become the first data unit of the second row of the output state, and the first data unit of the second row input state may become the second data unit of the second row of the output state. In the third row each data unit may be shifted by two positions, and in the fourth row each data unit may be shifted by three positions within the row. The input state of shift rows operation 204 may be represented by a memristor array prior to shifting the values. The output state of shift rows operation 204 may be represented by signals representing bits arranged according to the shift, the same memristor array as the input array after the shift, or by a second memristor array having the arrangement of memristor values after the shift.

Mix columns operation 206 is an example of operation 112 of FIG. 1. During mix columns operation 206, bytes of each column are mixed with one another by a matrix multiplication. During the matrix multiplication, data units of columns of the input state may be multiplied by data units of each row of a fixed data block. In each multiplication of a column by a row, the data units of the column may be multiplied by the data units of a row on data-unit-by-data-unit basis. The values of the fixed data block may be determined by AES. The values of the data units of the input state and output state of the mix column operation 206, are typically different from one another. The input state of mix column operation 206 may be the third data block resulting from execution of instruction 112 (which is the output state of shift rows operation 204), and the output state may be the fourth data block.

During the multiplication of data units, the multiplying of an instance of a first data unit by an element of the second data unit may be performed by shifting the values of the memristors representing the instance of the data unit by the same number of positions as the power of the base of the element of the second data unit. For example, if the element of the second data unit is in the $b^2$ or $x^2$ position in the data unit (where b or x is the base of the value represented by the data unit), then each value of the instance of the first data unit is shifted by two data-unit-positions (or two places). During mix columns operation 206, operation 112 is repeated for each data unit of each column of the third block of data. Similarly, the sequence started by suboperations 110 and 112 may be continued for each element of the first data unit. In other words, for each element of the second data unit, there may be another instance of the first data unit that is multiplied by another element of the second data unit. After multiplying each data unit of a column of data by an element of a row of a fixed matrix, the results of the multiplications are added together (by adding currents of respective terms each data unit to one another) to a arrive a data unit of a column of the output state. The column mixing operation is discussed further conjunction with FIG. 4.

Key addition operation 208 is an example of operation 120. The addition of operation 116 and the addition of currents of suboperation 112 is a finite field addition (or modulo 2 addition). Thus, during key addition operation 208, a portion of the key may be bitwise exclusive OR'ed to the output state of mix columns operation 206.

Figure 3:
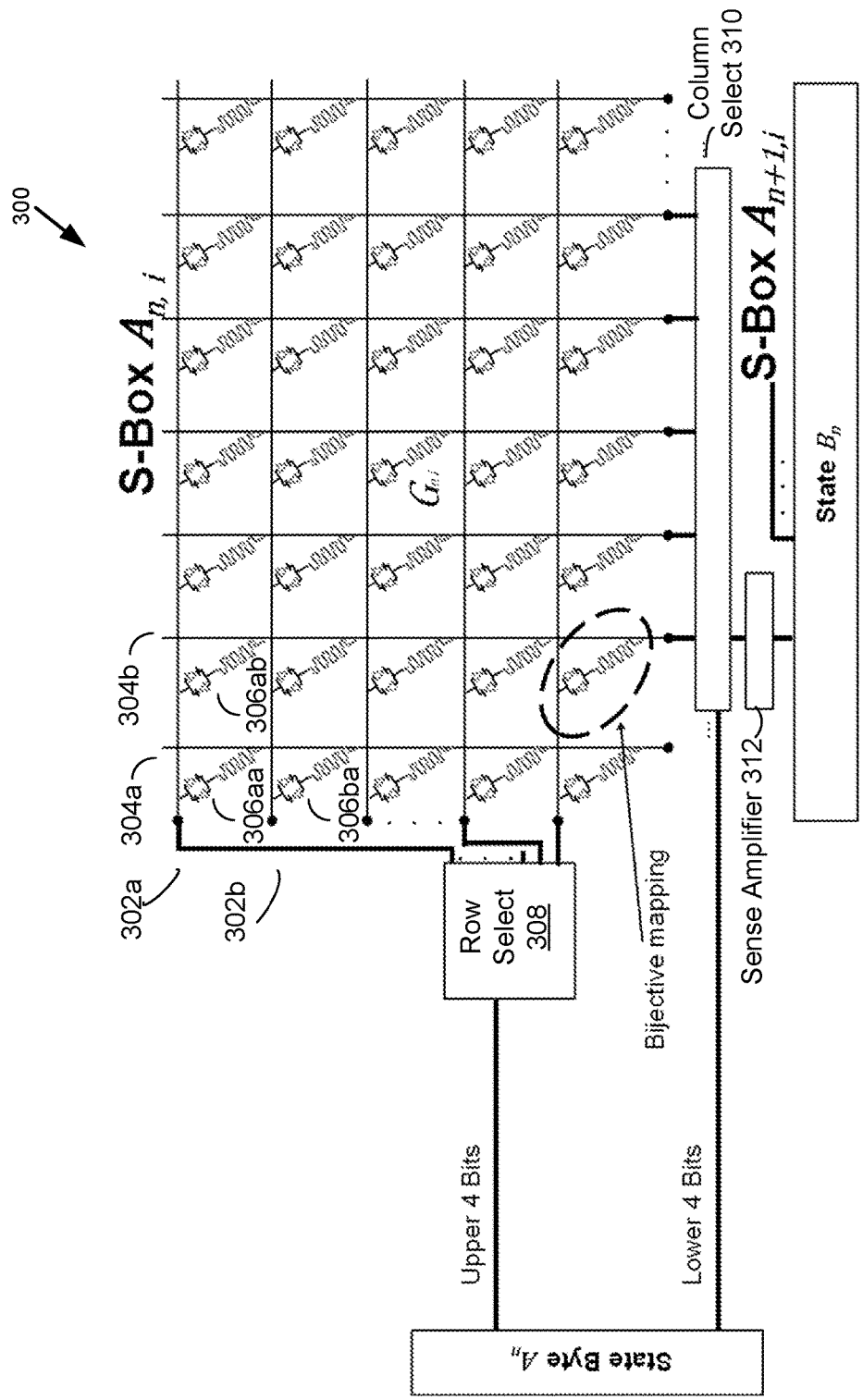
FIG. 3 illustrates an example of a memristor array that may be used as a lookup table for performing a data unit substitution.

FIG. 3 illustrates an example of a memristor array 300 that may be used as a lookup table for performing the byte substitution. Array 300 may include rows 302a-n, columns 304a-m, memristors 306aa-nm, row select circuit 308, column select circuit 310, input state data unit $A_n$, and output state data unit $B_n$. Element $A_{i,n}$ is the ith element of the nth data unit. Rows 302a-n and columns 304a-m are row and column electrodes that may be used to select one of memristors 306aa-nm. Row select 308 is the circuit that chooses the row electrode to select, and the column select 310 is the circuit that chooses the column electrode. The intersection of the column electrode and row electrode selected determines the memristor selected, which may have a value corresponding to 0 or 1, for example. The value written to the memristor depends on the direction of the current flowing through the memristor. The memristor element may have its own threshold that needs to be overcome to write to the memristor and may be a metal oxide device, for example. Alternatively or additionally a threshold switch (e.g., a transistor, Zener diode, an avalanche diode, metal-oxide-metal device, or metal-insulator-metal device) may be placed in series with the memristor to establish a desired threshold that needs to be overcome to write to the memristor. Row and column selection may be used for writing a value to a memristor using a voltage or current value that is above a defined threshold, and may be used for reading a memristor with a current that is lower than any threshold needed to write to the memristor. The memristor array may be raster scanned to write to, and read values of, individual memristors.

The upper bits of an input data unit may be fed to the row select 308 and the lower bits of the input data unit are fed into column select 310 (or the reverse). The value of the memristors that are selected are read by sense amplifier 312.

The lookup table may be arrived at by construction a table having n rows and columns. The number n is the highest number that can be represented by half the elements of the data unit. For example, if each data unit is one byte, then n is 16, which is the highest number that can be represented by 4 bits. Two arrays of memristors may be used for looking up the new value of a data unit. One array may store the lower bits, which may be the first place (the $16^0$th place) of hexadecimal value or first 4 bits of the data unit. A second array may be used for storing the upper bits, which may be the second place (the $16^1$th place) or second 4 bits of the hexadecimal value of the new data unit. Optionally, each of the two memristor arrays receives the same upper and lower bits for looking up the value of interest and each of the two memristor arrays may share the same row or column electrodes. In the example of FIG. 3, the data unit has 8 bits, which may have 256 possible values. In this example, the 256 possible values for the substitution box, may be stored in the two 16×16 lookup tables.

For example, for data units that are one byte long, if the upper bits are 0001 and the lower bits are 0001, then the replacement data unit is located at coordinates (0001,0001) in the table. If the element at position (0001,0001) is the hexadecimal value 63, then the four memristors of the first table will store the values 0110 (or 6), and the four memristors of the second table will store the value 0011 (or 3). Thus, in this example, if $A_0$=00010001, then $B_0$=01100011.

One may find the inverse polynomial for the polynomial represented by each value in the table. The inverse can be found by applying an extended Euclidean algorithm to the equation $a(x)(b(x)+m(x)d(x)=1$, where $b(x)=a(x)^{-1}$ mod $(m(x))$, and $d(x)$ is polynomial that is found by the extended Euclidean algorithm. The polynomial $m(x)$ is $1+x+x^3+x^4+x^8$. For example, if $a(x)=x$, then $d(x)=1$, and the inverse of $a(x)$ is $b(x)=1+x^2+x^3+x^7$.

The bits of the inverse are circularly rotated, and a value (e.g., the hexadecimal value 63) is added to the result. This helps ensure that no element of the table has the value zero, so that inverse operation may be performed during decryption. For example, the following matrix transformation may applied to the inverse values $b(x)$ to obtain the new values $b'(x)$ is $$b'_i = \left(\sum_{j=0}^{n} M_{ij} b_i\right) + d_i \text{ or } \begin{pmatrix} b'_0 \\ b'_1 \\ b'_2 \\ b'_3 \\ b'_4 \\ b'_5 \\ b'_6 \\ b'_7 \end{pmatrix} = \begin{pmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{pmatrix} \begin{pmatrix} b_0 \\ b_1 \\ b_2 \\ b_3 \\ b_4 \\ b_5 \\ b_6 \\ b_7 \end{pmatrix} + \begin{pmatrix} 1 \\ 1 \\ 0 \\ 0 \\ 0 \\ 1 \\ 1 \\ 0 \end{pmatrix}$$

The data unit corresponding to $b(x)$ is the data unit that appear at the coordinates $A=((a_7, a_6, a_5, a_4), (a_3, a_2, a_1, a_0))$ of the lookup table. For example, the first entry of the table, may have coordinates 0, 0, and may have the value 63 when written in hexadecimal. Adding the value 63 helps ensure that none of the output data units have a value of 0.

In the above, the multiplication of two bits ($M_{ij}$, $b_i$) is equivalent to a logical AND operation between the currents of the memristors representing the two data elements that are multiplied. The summations in the above transformation are exclusive OR operations. The exclusive OR operations may be performed two-at-a-time, for example. Each of the values of the above transformation may be stored in (e.g., written to) the memristor array or for otherwise used representing the output values $b_i$'. Although the replacement value of for each data unit may be computed as above in the memristor array, as needed, looking up data in a table may be performed by the memristor array, quicker and more efficiently than performing the above transformation for each data unit.

The output state of byte substitution operation 300 is the input state for the row shift. This may be accomplished by having the output current from reading the values of the memristors of the lookup table as the rows or columns of the data units of the shifted state. The output current from data unit $B_1$ of the substitution box may be used to write the memristor values of $B_5$' of the shifted state or as the value of the data unit that is multiplied by the second element of the rows of the fixed matrix (03 of the first row, 02 of the second row, of the third row 01, of the fourth row 01).

Figure 4:
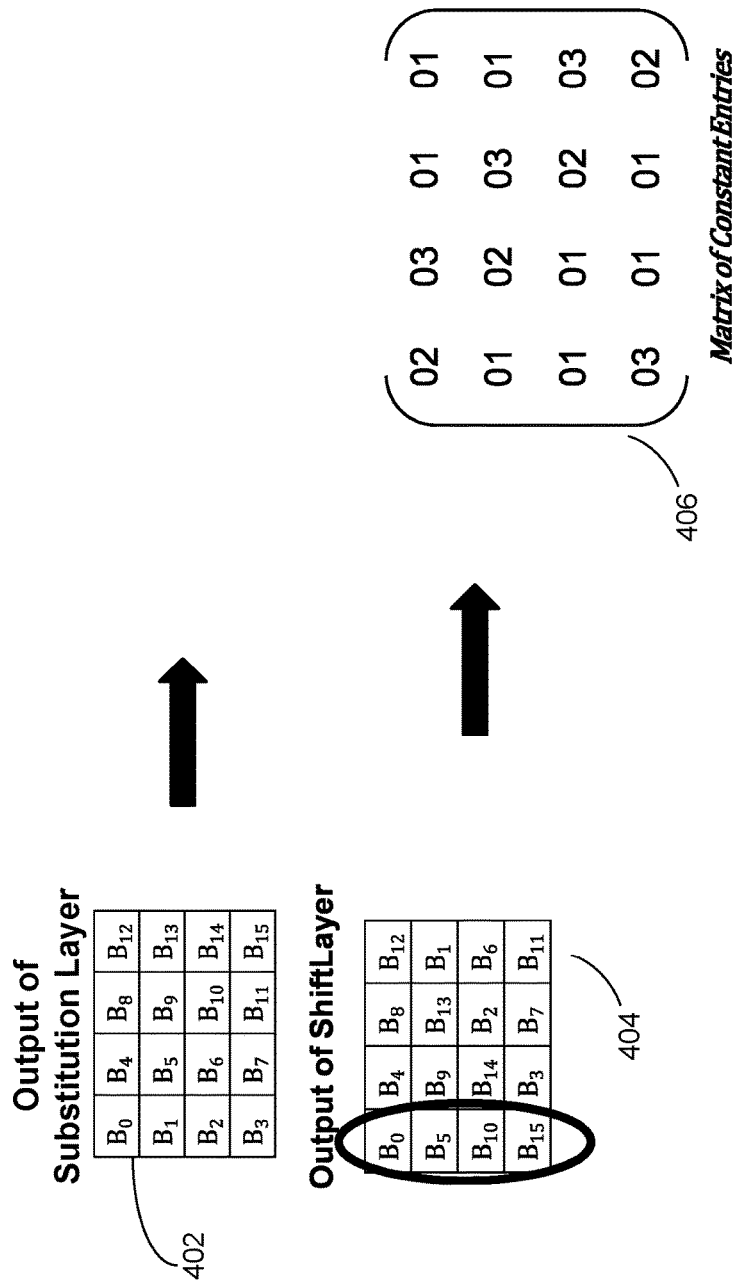
FIG. 4 illustrates an example of operations performed during a row shift and column mix.

FIG. 4 illustrates examples of the operations 400, which are performed during a row shift operation 204 followed by a column mixing operation 206. In FIG. 4, the input state 402 for the row shift is the output state of the substitution. This may be accomplished by using the output of the column electrodes of the substitution layer as the input of the column and row electrodes of the memristor array representing the shifted data unit. For example, the output from the first column, second row of the substitution layer may share column electrodes with the input memristor array of the second column, second row of the input to the mix column layer, for example. Similarly, the output from the last column, second row of the substitution layer may share column electrodes with the input memristor array of the first column, second row of the input to the mix column layer, for example.

After shifting the row of state 402 (as described above in conjunction with row shift operation 204), state 404 is arrived at, which is the output state of the row shift or the input state of the column mix.

During the column mix, each column of the input state 404 is multiplied by a row of the matrix 406 to obtain a new set of columns for the new state. In the example of FIG. 4, each row of matrix 406 has the same fixed collection of 4 values, two of which are the same (01, 01, 02, and 03). However, the order in which the values are placed is different in each row is different. In this example, during encryption, to perform the matrix multiplication, one only needs circuits for performing a multiplication by 01, 02, and 03, and for adding the results of the four multiplications. Multiplying one of data units $B_0$ to $B_{15}$ by 01, 02, or 03 may be performed as a multiplication of two polynomials. Since 01 is just the polynomial 1, multiplication by 01, leaves the data unit of the input state unchanged.

If the output values for the data unit (e.g., having bits $C'_0$-$C'_7$) of the column mix operation 206 is written to the locations in the output state as determined for data units $b(x)$ (e.g., having bit values $B_0$-$B_7$) by shift rows operation 204 (which are indicated in the matrix, state 404), the signal representing the input data unit $b(x)$ may come directly from the lookup table without expressly writing the output of shift rows to a memristor array.

Figure 5:
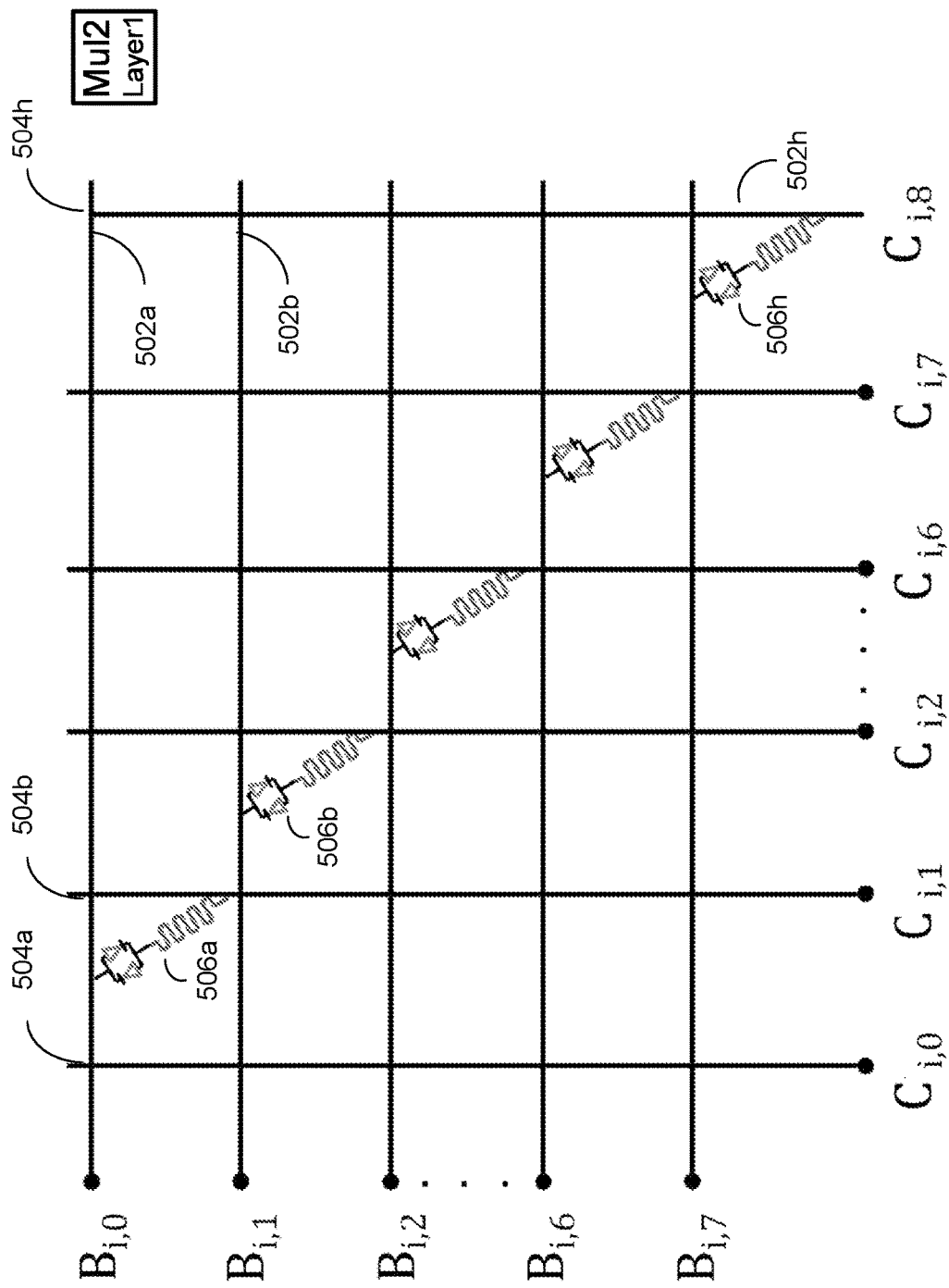
FIG. 5 illustrates an example of set of memristors used in computing an intermediate result of the multiplication of a polynomial representing a data unit by a fixed polynomial.

FIG. 5 illustrates a cross bar array having row electrodes 502a-h, column electrodes a-h, which identify memristors 506a-h, for example. In FIG. 5, only the memristors that represent non-zero coefficients of the polynomial are shown. Bits $B_0$-$B_7$ represent the input state and the output is represented by the currents $C'_0$-$C'_7$. FIG. 5 shows the result of multiplying the polynomial $1+x+x^5+x^6+x^7$ by x (or 02), which results in the polynomial $x+x^2+x^6+x^7+x^8$. In this example, the result of multiplication by x is to shift the values by one element-location along the row (and column) of data of the data unit. For multiplication by x, this may be done by aligning the output of the column electrodes from the matrix of memristors representing the polynomial prior to the multiplication with the input of the array representing the polynomial after multiplication, with each electrode shifted by one place. Similarly, the output of the row electrodes from the matrix of memristors representing the polynomial prior to the multiplication is connected with the input of the array representing the polynomial after multiplication, with each electrode shifted by one place. For example, when multiplying a polynomial $b(x)$ by x, the column electrode identifying the memristor representing the coefficient of $x^7$ of the input polynomial may become the column electrode for the column representing the coefficient of $x^8$ of the output memristor array. As an alternative example, the column electrode carrying the value of the coefficient of the $x^7$ term of the input polynomial may be used for producing the signal that selects the column electrode of the $x^8$ term of the output memristor array. Similarly, in this example, the row electrode identifying the memristor representing the coefficient of $x^7$ of the input polynomial may be used to generate the input signal to address row electrode representing coefficient of $x^8$ of the output memristor array.

Figure 6:
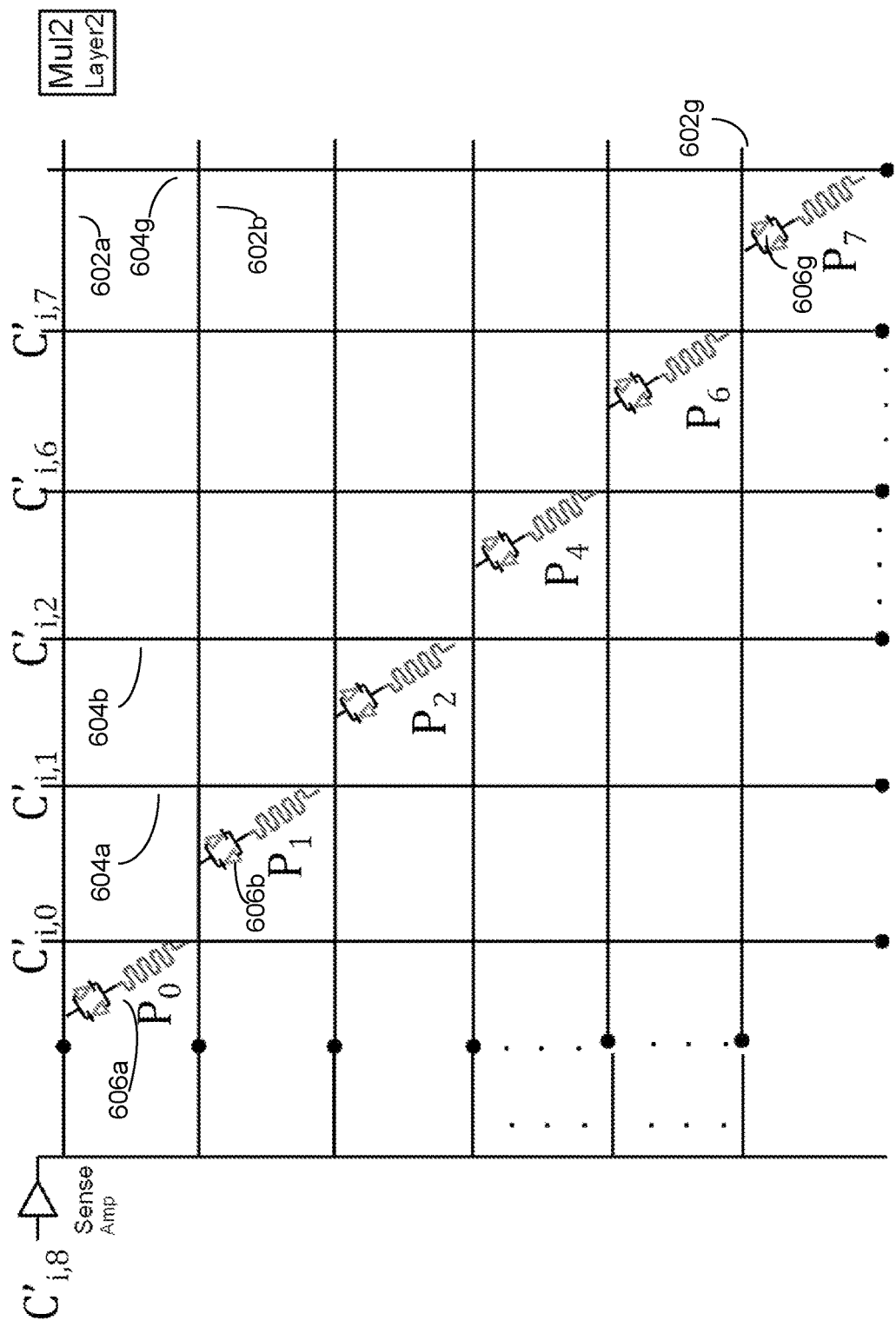
FIG. 6 illustrates an example of a set of memristors representing a polynomial that results after reduction.

FIG. 6 illustrates the intermediate result after reduction of the polynomial of FIG. 5. In FIG. 6, row electrodes 602a-g are different than row electrodes 502a-h, and memristors 606a-g are different than memristors 506a-g. The input currents $C'_0$-$C'_7$ of FIG. 6 are the same as the output currents of FIG. 5. The current $C'_8$ from the eighth column electrode of FIG. 5 controls whether to reduce the polynomial of FIG. 5 to keep the result modulo $1+x+x^3+x^8$. If the current associated with $C'_8$ corresponds to a bit value of 1, the reduction polynomial $(1+x+x^3+x^8)$ may need to be subtracted, modulo 2, from the result of the multiplication to reduce the polynomial of FIG. 5. The signal from $C'_8$ may be amplified and used to create the current or signal for the column and row electrodes for reading the values of the memristor array representing the reduction polynomial. The currents produced on the column electrodes by reading the reduction polynomial may be added to the currents of the output the multiplication to perform the reduction. In the above example, subtracting the coefficients of the terms of the polynomial, term by term, one obtains, $x+x^2+x^6+x^7+x^8-(1+x+x^3+x^4+x^8)$ $1+x^2+x^3+x^4+x^6+x^7$. When multiplying a polynomial by 02, a two-layer computation may be used, in which the first layer is a multiplication by x. Optionally, as part of the first layer, the polynomial resulting from the multiplication is reduced by the polynomial $1+x+x^3+x^4+x^8$ Optionally, as part of each multiplication layer in which the polynomial is multiplied by a power of x greater than 0, there may be a reduction (alternatively, the reduction may happen at different layer). During the sense layer, the results of the multiplication, and optionally the reduction of the polynomial that resulted from the multiplication, are sensed or detected. The sense layer may perform the reduction. The sense layer may detect whether the polynomial has more elements than allowed (or whether the polynomial has a term of a power that is greater than the highest power term allowed in a data unit). For example, if the data unit is a byte, the sense layer may detect whether the polynomial has a term that is higher than $x^7$. If it does, the polynomial that results from the multiplication is reduced. The currents $C'_0$-$C'_8$ are the sum of the currents from the polynomial of FIG. 5 and the currents from the reduction polynomial, the results of the two multiplications are added together (modulo 2).

The value 03 can be represented by the polynomial $1+x$. To multiply a polynomial by 03, a first instance of the polynomial is represented by first group of memristors. The first instance of the polynomial represents the multiplication of the polynomial by 1, and so nothing more needs to be done to obtain the result of the multiplication by 1. A second instance of the polynomial is multiplied by x, modulo $1+x+x^3+x^4+x^8$. Thus, using the results from the multiplication by x, discussed above, if the polynomial $1+x+x^5+x^6+x^7$ is multiplied by $1+x$, the result is $$\begin{array}{r} 1+x+x^5+x^6+x^7 \\ +1+x^2+x^3+x^4+x^6+x^7 \\ \hline x+x^2+x^3+x^4+x^5 \end{array}$$

Multiplication by 03 involves three layers. There is one layer for each term of the polynomial x+1 (which may include the reduction by the polynomial $1+x+x^3+x^4+x^8$), and a sense layer for detecting the results of the prior layers (and optionally for performing the reduction). Since in the above example, the highest order term that can result is $x^8$, the ninth column of the memristor array used for the polynomial multiplication may be used as a control bit for whether to perform the reduction by the polynomial $1+x+x^3+x^4+x^8$ of the polynomial resulting from the multiplication by x or by 1+x. The output of the electrode representing the coefficient of $x^8$ term of the polynomial that results from the multiplication may be used to generate the signal on the row and column electrodes of the rows and columns corresponding to terms of the reduction polynomial $1+x+x^3+x^4+x^8$ that have nonzero coefficients. This may read or write (if not already written) to the memristors representing the reduction polynomial that correct values. Then the currents from the memristors representing the resultant polynomial are added to the current of the memristors representing the reduction polynomial to obtain the result of the reduction. There is no need for summing the currents from the column electrodes representing the $x^8$ term, because it is known in advance that term does not occur in the reduced polynomial. As a result, no memristor or signal is needed for representing the term $x^8$ in the memristor arrays or signals used for performing the addition during the reduction.

Figure 7:
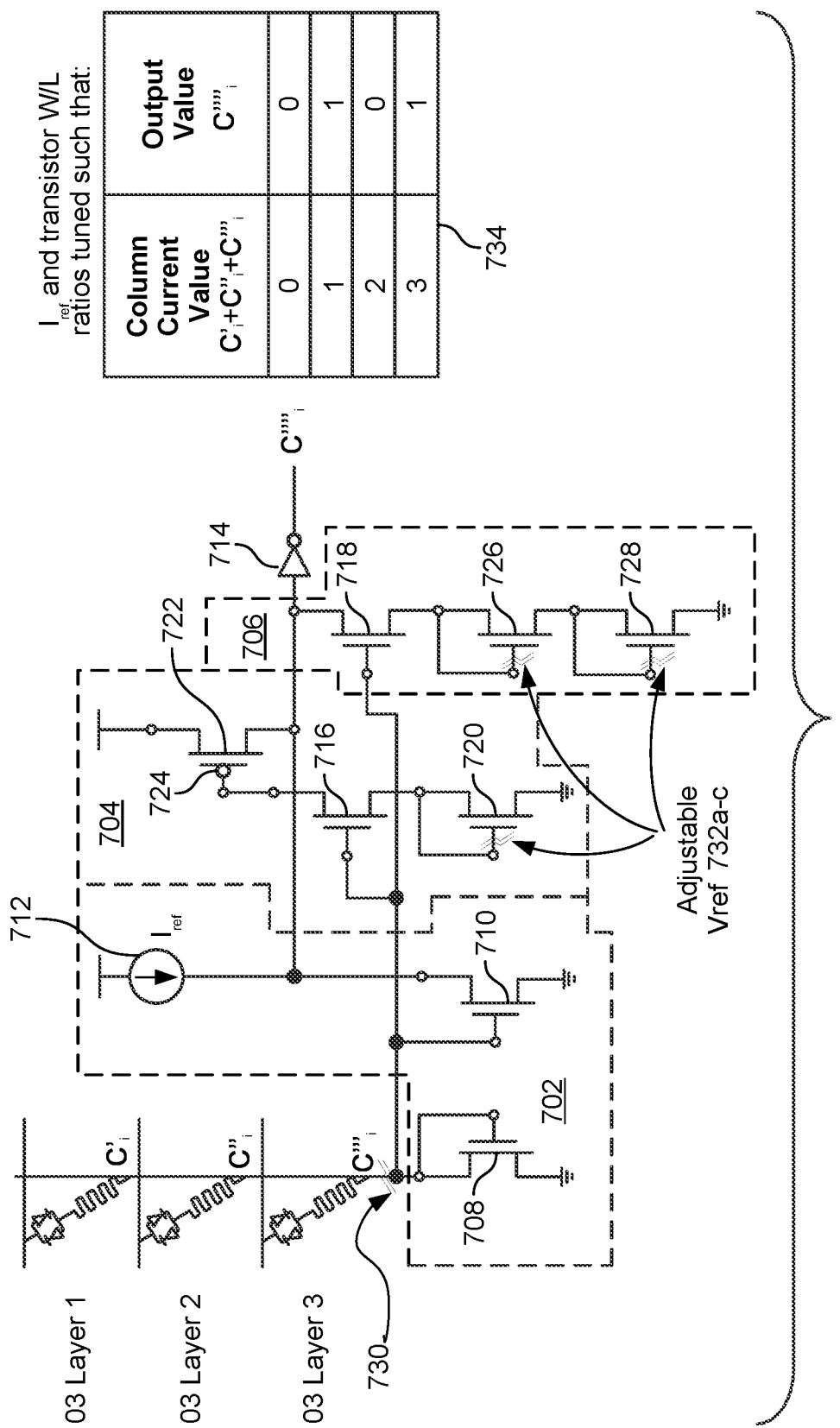
FIG. 7 illustrates an example of circuit for converting analog addition of memristor currents to digital output.

FIG. 7 illustrates a 3-stage circuit for summing the results of multiplication by 1, the results of multiplication by x, and the polynomial $1+x+x^3+x^4+x^8$ when computing a multiplication by 03, which includes stages 702, 704, and 706. When multiplying by 01, stages 704 and 706 are not needed and may be left out. When multiplying by 02, stage 706 is not needed and may be left out of the circuit. Alternatively, the same circuit having all three stages may be used for interpreting the output currents from the polynomials that result from multiplying by 1, x, or x+1. The current from each term of layers 1, 2, and 3 are summed term-by-term, and there may be 9 sums—one for each power of x. The potential contribution from each layer to any term is the same and may be designated as 0 or 1 depending on whether the value of the coefficient to that term of the polynomial is 0 or 1. For any given term, using Kirchhoff's law, the result of adding currents (or signal) flowing through the memristors may be one of 0, 1, 2, or 3 times the value of current (or signal) that represents 1. If the current is below a value that corresponding to the bit value of 1, then threshold values for the gate of transistor 710, 716, and 718 are not reached, and so no current flows to ground from reference current 712. Instead, the reference current 712 flows completely to input gates of inverter 714. Consequently, the output of the inverter corresponds to bit value of 0. If there is a current flowing from layers 1, 2, or 3, then the gate of transistor 710, 716, or 718 open a current path to ground depending on whether the current corresponds to bit value of 1, 2, or 3, a portion of the reference current 712 travels to ground instead to inverter 714. The effect of stage 702 is to mirror the additive currents flowing through the column without altering the current. When multiplying by one, stage 702 has the effect of normalizing the output of the memristor array being read, by using inverter 714 to produce the value of the signal corresponding to a bit value of 1 or 0, without amplifying the noise in the circuit.

Stage 704 has an effective threshold voltage corresponding to a bit value of 2, and stage 706 has an effective threshold voltage corresponding to a bit value of 3. If the current from layers 1, 2, and 3 corresponds to a bit value of 2, then the gates of transistors 716 and 720 open, which in turn causes the inverter 724 to open the gate of transistor 722. As a result of opening the gate of transistor 722, a current may flow through transistor 722, changing the state of inverter 714, generating an output corresponding to a bit value of 0. The effective threshold of stage 704 is a combination of the voltage threshold of the gates of transistors 716 and 722, which is higher than the voltage threshold of transistor 716 alone or transistor 722 alone, because voltages in series add. The threshold may be adjustable to fine tune the threshold value of stage 2.

If the sum of the current of the three layers has a value corresponding to a bit value of 3, then the effective threshold of stage 706 is reached, which causes the gate of transistors 718, 726 and 728 to open. The current from transistor 718 opens the gate of transistor 726. Transistor 726 in turn opens the gate of transistor 728. As a result of opening the gate of transistors 718, 726, and 728, the current from transistor 722 flows through transistors 726 and 728 to ground instead of only to inverter 714, and inverter 714 generates an output current corresponding to a value of 1. The threshold required to open all three gates of transistors 718, 726, and 728 is higher than were one or more of these three transistor missing, and is adjusted so as to be crossed when the current is 3 times that which corresponds to a bit value of 1. Column select 730 represents circuitry for selecting the column electrodes and circuitry having the clamp transistors. Adjustable Vref 732a-c may be used for fine tuning the thresholds associated with the gates of transistors 720, 726, and 728. Adjustable Vref 732a may be adjusted so that the threshold for the gate of transistor 720 corresponds to a bit value of 2. Adjustable Vref 732b and c may be adjusted so that the thresholds associated with the gates of transistors 726 and 728 correspond to a bit value of 3. Adjustable Vref 732a-c are optional. Table 734 is a truth table showing the input of circuit 700 and the resulting output.

Figure 8:
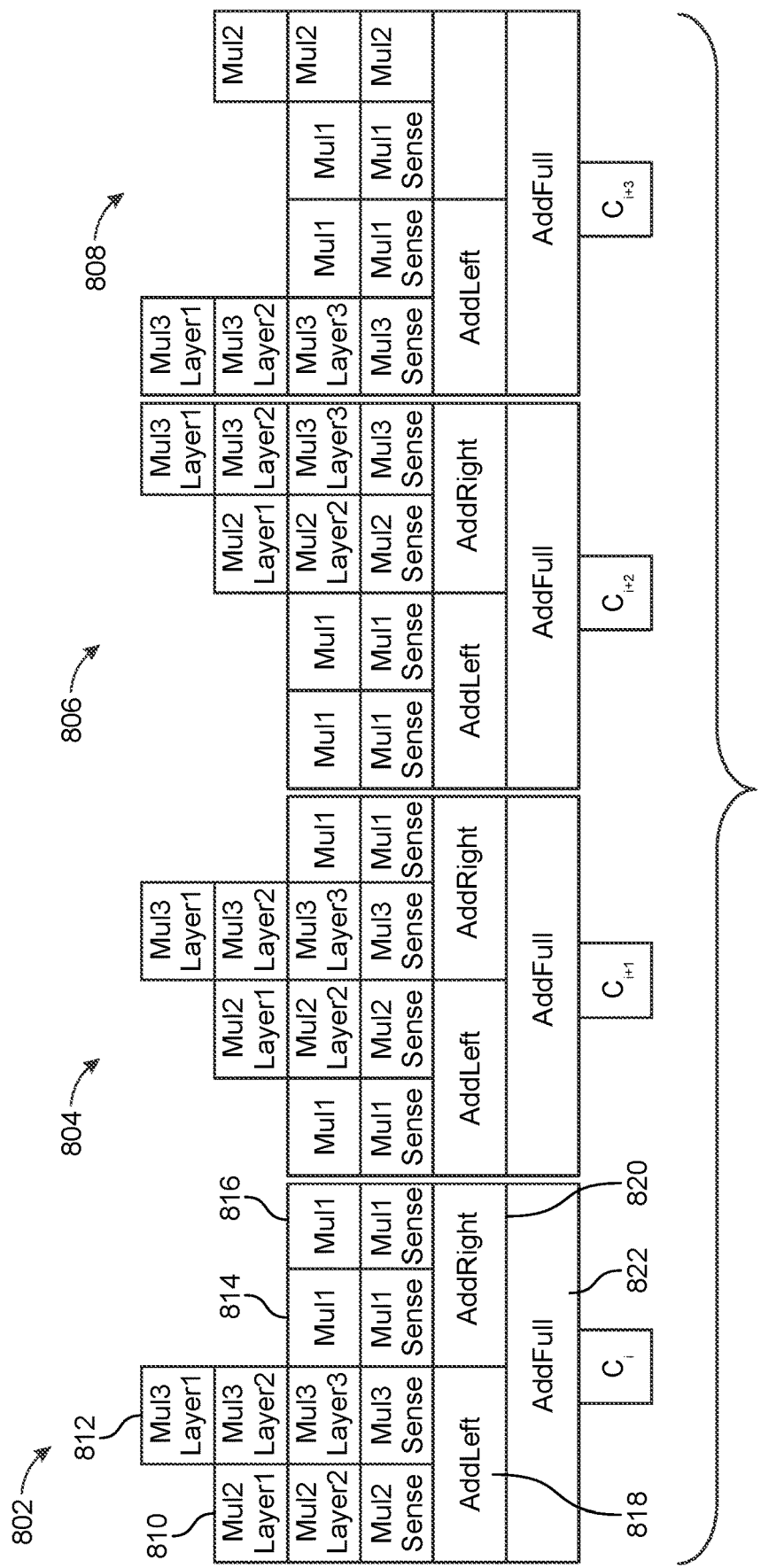
FIG. 8 illustrates an example of details of a matrix multiplication associated with a column mix.

FIG. 8 illustrates further details of the multiplication of each row of the matrix 406 of FIG. 4. Memristor arrangement 802 computes the multiplication of a column of a block of a state by the first row of matrix 406. Similarly, memristor arrangements 804, 806, 808 compute the multiplication of the column by the second, third, and fourth row of matrix 406, respectively. Column 810 corresponds to the multiplication of a first data unit of a column of an input array by the value 02. Similarly, columns 812, 814, and 816 correspond to the multiplication of data unit of the column by the values 03, 01, and 01, respectively. For any given column of any of the memristor arrangements the boxes MUL X, Layer Y (e.g., MUL 2, Layer 1), represent a layer that is used in the multiplication of the polynomial for the value Y (e.g., 01, 02, or 03).

Currents of the memristor arrays represented by the layers may be summed along the columns of memristor arrangements 802, 804, and 806. For example, the different layers of column 810 may be summed with one another. The sum of the different layers of column 812 may be summed with one another. Then the result of the sum of column 810 and column 812 may be summed with one another by AddLeft circuit 818. Also, columns 814 and 816 may be summed together to by AddRight circuit 820. Then, the value resulting from AddLeft circuit 818 is added to the value resulting from AddRight circuit 820 and added to a portion of the key by AddFull circuit 822. AddLeft circuit 818, AddRight circuit 820, and AddFull circuit 822 may be examples of the circuit of FIG. 7. There may be separate memristor arrays for storing the results of each of AddLeft circuit 818, AddRight circuit 820, and AddFull circuit 822, respectively.

By performing the sums in the manner prescribed, there is never a need for a circuit that sums more than 3 values of current at a time, and the circuit of FIG. 7 does not need a fourth stage, during encryption. In each of memristor arrangements 802, 804, 806, and 808, "MUL1" is the multiplication of a byte from a row with the value 01, "MUL2" is the multiplication of a byte from a row with the value 02, and "MUL3" is the multiplication of a byte from a row with the value 03. The only difference between memristor arrangements 802, 804, 806, and 808 is the locations of MUL1, MUL2, and MUL3 within each arrangement. Optionally, the encryption key may be added together with the result of AddLeft circuit 818, and AddRight circuit 820, using the circuit of FIG. 7 by AddFull circuit 822 to obtain the data units $C_{i+1}$ to $C_{i+4}$.

Figure 9:
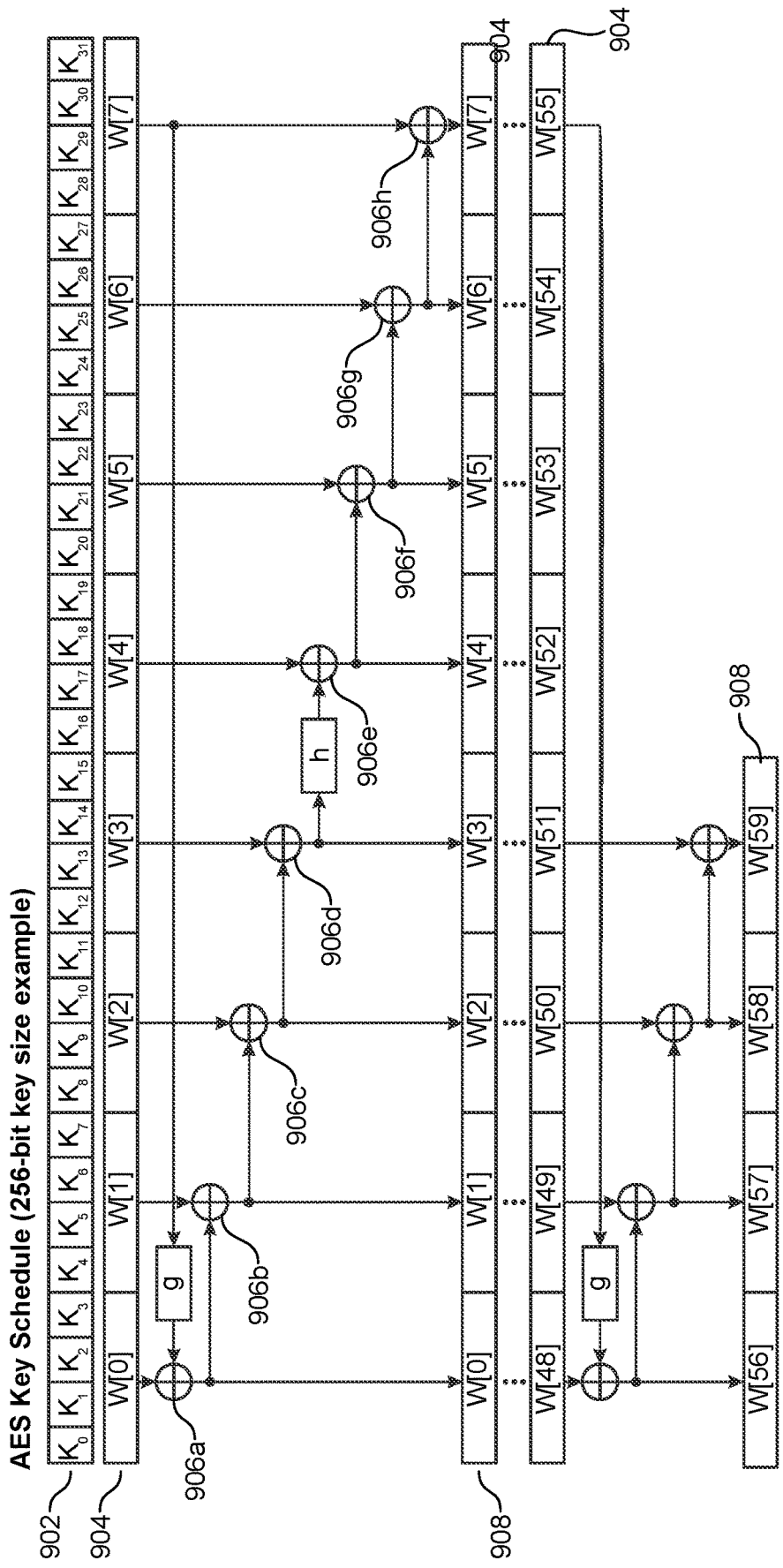
FIG. 9 illustrates an example of a further encryption of a state with an encryption key.

FIG. 9 illustrates the further encryption of the results of the scrambling process (the combination of the data unit substitution, row shift, and column mix). FIG. 9 is an example of the key addition operation 208. The output states of the column mix may be divided into words, of 32 bits each. Each byte of the word is encrypted (e.g., exclusive OR'ed) with a byte of the output state of the row mixing. In FIG. 9, key 902 represents the bytes into which the key is divided, which are labeled $K_0$, $K_1$, etc. State 904 represents the words of the output states by the word mixing, which are aligned with the portions of the key with which the words are encrypted. The output of adding key 902 and state 904 is divided into groups of 8 words. In the example of FIG. 8, the h-function is applied to the output of w[3] and added to w[4]. In an example, the h-function is applied to the output of the addition of the first 7 words with the key of each group of 8 words. Each group of 8 words is treated the same way.

A g-function is applied to the output of the eighth word of each group. The output of the g-function is added, by addition operator 908a to the output of the key addition of the first word of the 8-word group. An h-function is applied to the output of addition operator 908a, which is added by addition operator 908b to the output of the key addition of the next word, which in this case is word w[1]. An h-function is applied to the output of addition operator 908b, which is added by addition operator 908c to the output of the key addition of the next word, which in this case is word w[2]. An h-function is applied to the output of addition operator 908c, which is added by addition operator 908d to the output of the key addition of the next word, which in this case is word w[3]. The process continues until an h-function is applied to the output of addition operator 908h, which is added by addition operator 908h to the output of the key addition of the next word, which in this case is word w[7]. As a result of the key addition and the application of the g- and h-functions, words w[0], w[1], etc. of states 904 and 908 are not the same despite having the same labels. State 908 represents an output state. The memristor arrays representing the output state 908 may be used as the input state of the next round of encryption. The operations of the example FIG. 9 may be performed with collections of data units that are a different size than a word. Each round of encryption may use a different collection of memristors. Alternatively, each round of encryption may use the same collection of memristors by using set of memristors representing the input states and the output of the collection of memristors. Addition operators 908a-h may use the circuit of FIG. 7.

Figure 10:
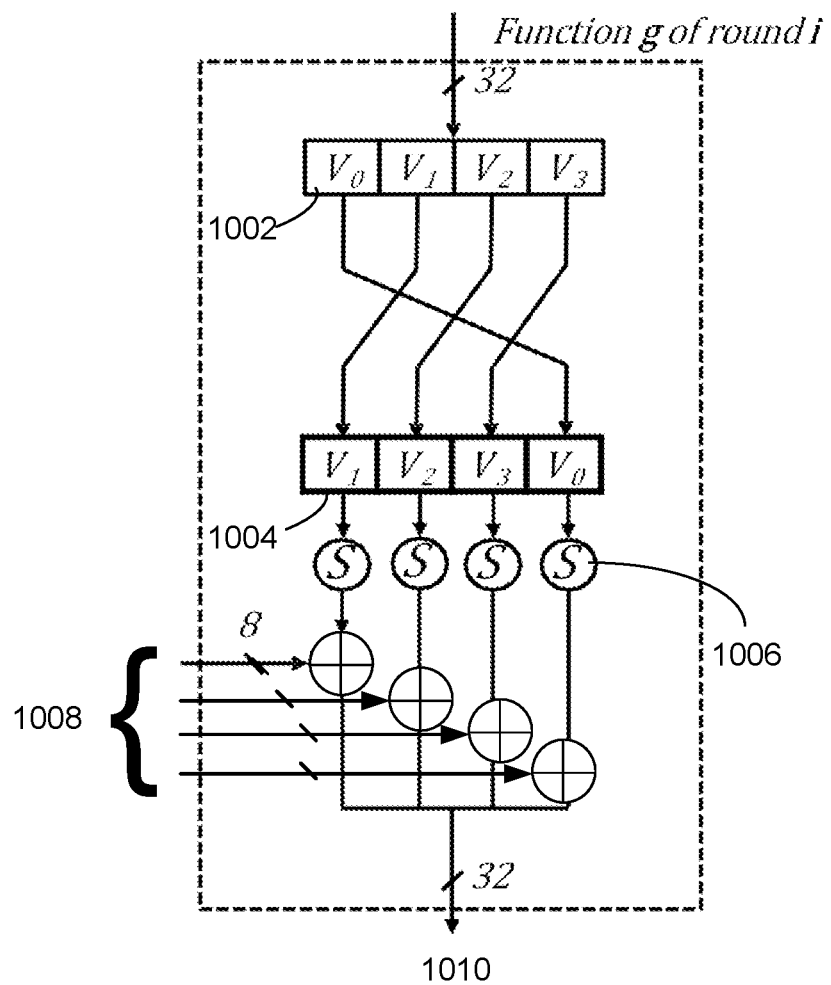
FIG. 10 illustrates an example of a first function that scrambles data during key addition.

FIG. 10 illustrates an example of the g-function. In FIG. 10, input state 1002 represents the input to the g-function (which results from the key addition of the process of FIG. 9). Intermediate state 1004 represents the next state within the g-function, which results from a data-unit shift. The data unit shift may be performed in a similar manner as discussed regarding row shift operation 204. For example, the data-unit shift may be 3 places of the data unit within the group of data units (e.g., a shift of 3 byte-places within a word).

Optionally, the shift may vary for each operation, or different operations, of the g-function. The next operation of the g-function is the application of a substitution box 1006, which may be implemented in the same manner as described in conjunction with FIG. 3. The output state of the substitution box 1004 may be added to the next group of data units (e.g., the next word), by additions 1008. Addition operations 1008 may be the same operation as addition operator 906*a*, for example, and may form a group of data units of the next state.

Figure 11:
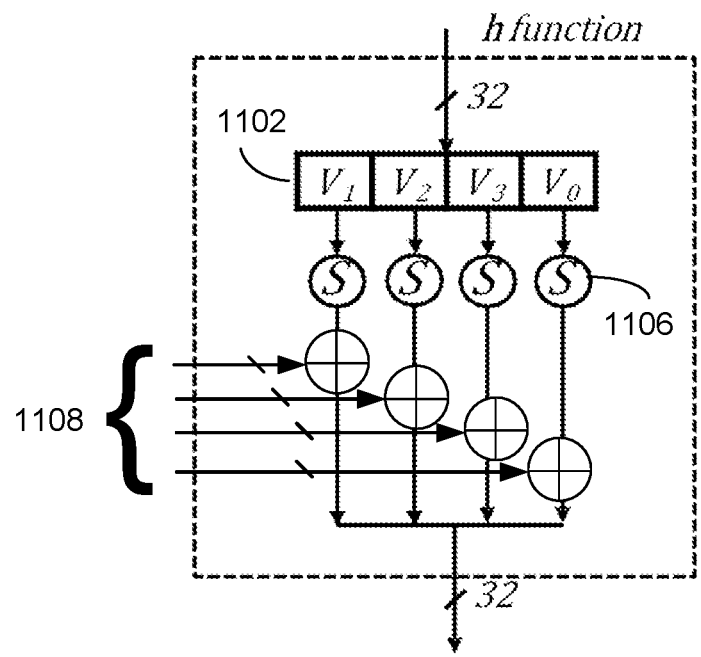
FIG. 11 illustrates an example of a second function that scrambles data during key addition.

FIG. 11 illustrates the h-function, which is the application of a byte substitution box to the input state to form the output state. The g-function includes a row mixing operation that is not necessary in the h-function. Input state 1102, substitution box 1106, and additions 1108 have similar descriptions as input state 1002, substitution box 1006, and additions 1008, respectively. However, in the example of FIG. 11, the input to the substitution box 1106 is the input state 1102, whereas the input to substitution box 1006 is the intermediate state 1004.

Figure 12:
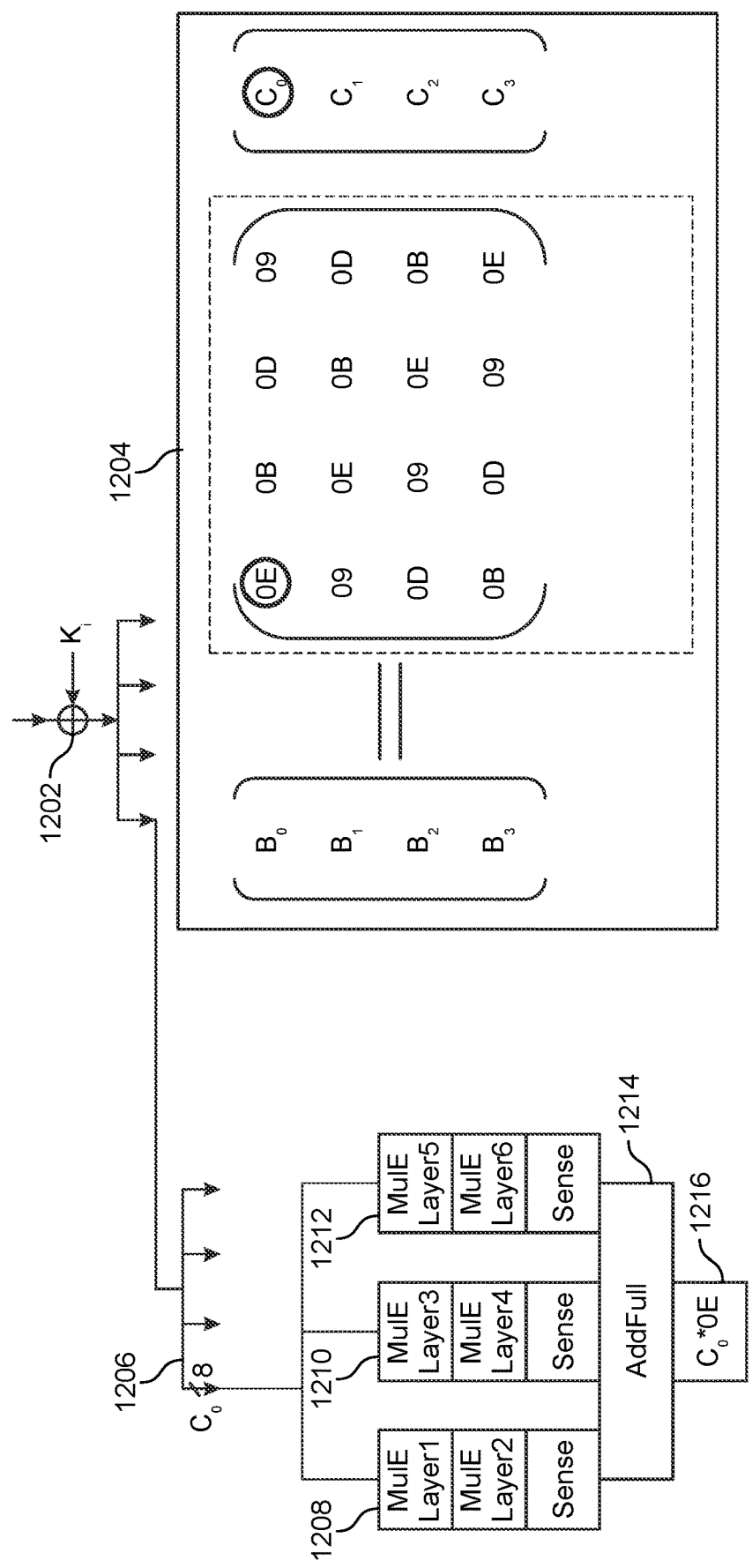
FIG. 12 illustrates an example of a matrix multiplication associated with an inverse row mix.

FIG. 12 illustrates a matrix multiplication of the inverse row mix. In general, decryption is performed by applying the inverse operations of the operations performed during decryption. The sequence of the inverse operations is the reverse order as the corresponding encryption operations. For example, during decryption, an inverse key addition 1202 is followed by an inverse column mix 1204, followed by an inverse row shift, and then followed by an inverse substitution box. FIG. 12 shows the inverse column mix 1204 includes a matrix multiplication using the inverse of matrix 406. The output of the inverse key addition is input state 1206, which may include a group of data units.

The inverse of matrix 406 includes the value 0E, for example, which may be represented by a three-term polynomial. Multiplying this polynomial by bytes of the input column requires more than 3 layers, which is a complication that does not occur during encryption. The multiplication of a byte by 0E may be performed as a 6-layer process, which is broken up into 3 two-layer processes 1208, 1210, 1212. The value 0E may represented as the polynomial $x^3+x^2+x$ (or 1110). In two-layer process 1208, a first instance of the data unit is multiplied by the first term of the polynomial for the fixed-value data unit of the matrix. If reduction is needed, the result is added to a multiple of the reduction polynomial, $1+x+x^3+x^4+x^8$, as a second layer of the two-layer process 1206. In two layer process 1210, a second instance of the data unit is multiplied by the second term of the fixed value data unit, which, if reduction is needed, is added to a multiple of the reduction polynomial, as a second layer of the process. In two-layered process 1212, a third instance of the data unit is multiplied by the third term of the fixed value data unit as a first layer, which, if reduction is needed, is added to a multiple of the reduction polynomial, as a second layer. The multiples (or the multiplier) of the reduction polynomial may be represented by polynomials. Further details of these reductions are discussed below. Alternatively, in each of two-layered processes 1208, 1210, or 1212, an instance of the fixed value data unit is multiplied by a term of the polynomial for the data unit 1206. Next, the results of two-layer operations 1208, 1210, and 1211 are added together in AddFull circuit 1214, and the result is data unit 1216. By using 3 two-layered operations, there is no need to add more than 3 polynomials at a time, and so the circuit of FIG. 7 may be used, and the polynomial multiplication may be performed efficiently.

Alternatively, one could add a fourth stage to the circuit of FIG. 7 having a threshold voltage corresponding to a bit value of 4 or 4 times the current as one bit. This stage would have 4 field effect transistors tied drain to source to one another. The chain of 4 field effect transistors would be tied to the voltage source. The gates of these transistors may be connected to their sources (as in the prior stages).

Regarding the reductions, the elements of the inverse matrix 1204 have a term of $x^3$ and consequently there may be $x^{10}$ terms in the polynomial resulting from the multiplication. Consequently, the polynomials that result from the matrix multiplication 1204, the current from the $9^{th}$, $10^{th}$, and $11^{th}$ columns may be used to trigger a reduction of the polynomial. The reduction of this polynomial may have 3 stages. Specifically, in the first stage, the current from the memristor representing the coefficient of the term $x^{10}$ may be used as a control current for reducing the product by the polynomial $x^2(1+x+x^3+x^4+x^8)$. The current (e.g., after amplification), or signals based on the current from the memristor representing the coefficient of the term $x^{10}$ may be used for reading the values of a memristor array representing the polynomial $x^2(1+x+x^3+x^4+x^8)$, and the values read may be added to the current of the polynomial resulting from the multiplication. If the current from the memristor representing the coefficient of the term $x^{10}$ corresponds to a bit value of zero, then at this first reduction stage, the currents added to the currents from the polynomial resulting from the multiplication will be low enough to be considered as a bit value of zero. Consequently, the polynomial resulting from the multiplication may remain unchanged during the first reduction stage, if the coefficient of the term $x^{10}$ has a value of 0.

Similarly, after the reduction to remove the term $x^{10}$ (or if the $x^{10}$ term was never present), in the second stage of the reduction, the current from the memristor representing the coefficient of the term $x^9$ may be used as a control bit to control whether to perform the reduction by the polynomial $x(1+x+x^3+x^4+x^8)$. The current from the term $x^9$ may be used to produce the signal to read this reduction polynomial. Likewise, after the reduction to remove the term $x^9$, the current from the memristor representing the coefficient of the term $x^8$ may be used as a control bit to control whether to perform the reduction by the polynomial $(1+x+x^3+x^4+x^8)$.

In the above process the memristor is used as both a compute unit and a for storage. One of ordinary skill in the art would not think to use the memristors as compute units for manipulating data units or polynomial manipulations, in the context of encryption.

Figure 13:
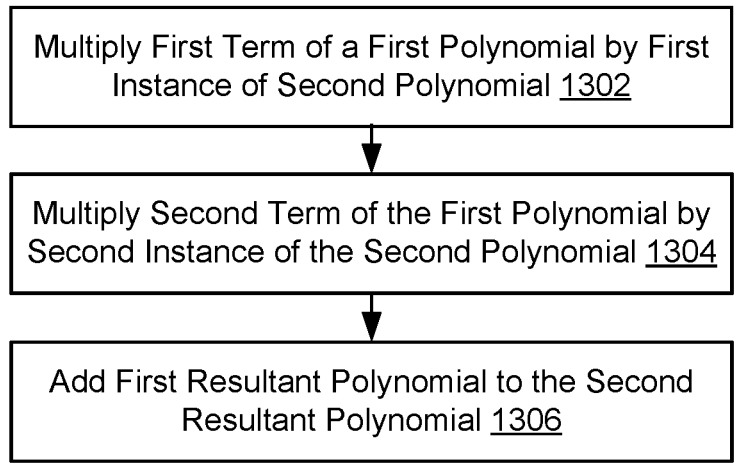
FIG. 13 illustrates an example of a method for encrypting data within a memristor array.

FIG. 13 illustrates an example of a method 1300 for encrypting data. Method 1300 may be used for performing column mixing and may be another example of operation 112 (FIG. 1). Alternatively, method 1300 may be its own encryption method, which encrypts or partially encrypts data by scrambling the data.

In operation 1302, a first term of a first polynomial is multiplied by a first instance of a second polynomial. The first polynomial may represent a first data unit. The second polynomial may represent a second data unit. The multiplication results in a first resultant polynomial. The first resultant polynomial may be represented by a first set of memristors. The first data unit or the second data unit may represent a data unit of the data being encrypted (the second data unit may be a data unit having a fixed value or another value).

In operation 1304, a second term of the first polynomial is multiplied by a second instance of the second polynomial. The result is a second resultant polynomial. The second resultant polynomial may be represented by a second set of memristors.

In operation 1306, the first resultant polynomial is added to the second resultant polynomial by adding respective currents associated with the first and second sets of memristors (e.g., the addition of the polynomials may be performed by adding currents according to Kirchhoff's law, which may be interpreted by the circuit of FIG. 7 according to truth table 734).

In the above discussion, a row of a memristor array may correspond to a row of a block of data. Alternatively, a row of a memristor array may correspond to column of a block of data or may have a different relationship. In general, in the discussion of FIG. 1-13, the roles of the rows and columns may be interchanged.

To extend the system to include n symbols (instead of just 2 symbols) addition and subtraction is performed modulo n, and the thresholds of the circuit of FIG. 7 would need to be adjusted to allow values of more than one or modified in other ways. To change the number of elements in a data unit, a different reduction polynomial would be used. The value of the coefficient of the highest term may be the value of the highest valued symbol (e.g., 3 for a base 4 system). The highest power term of the reduction polynomial has a power that is equal to the number of elements in the data unit. Other encryption methods and computations may be performed using the techniques disclosed above.

Figure 14:
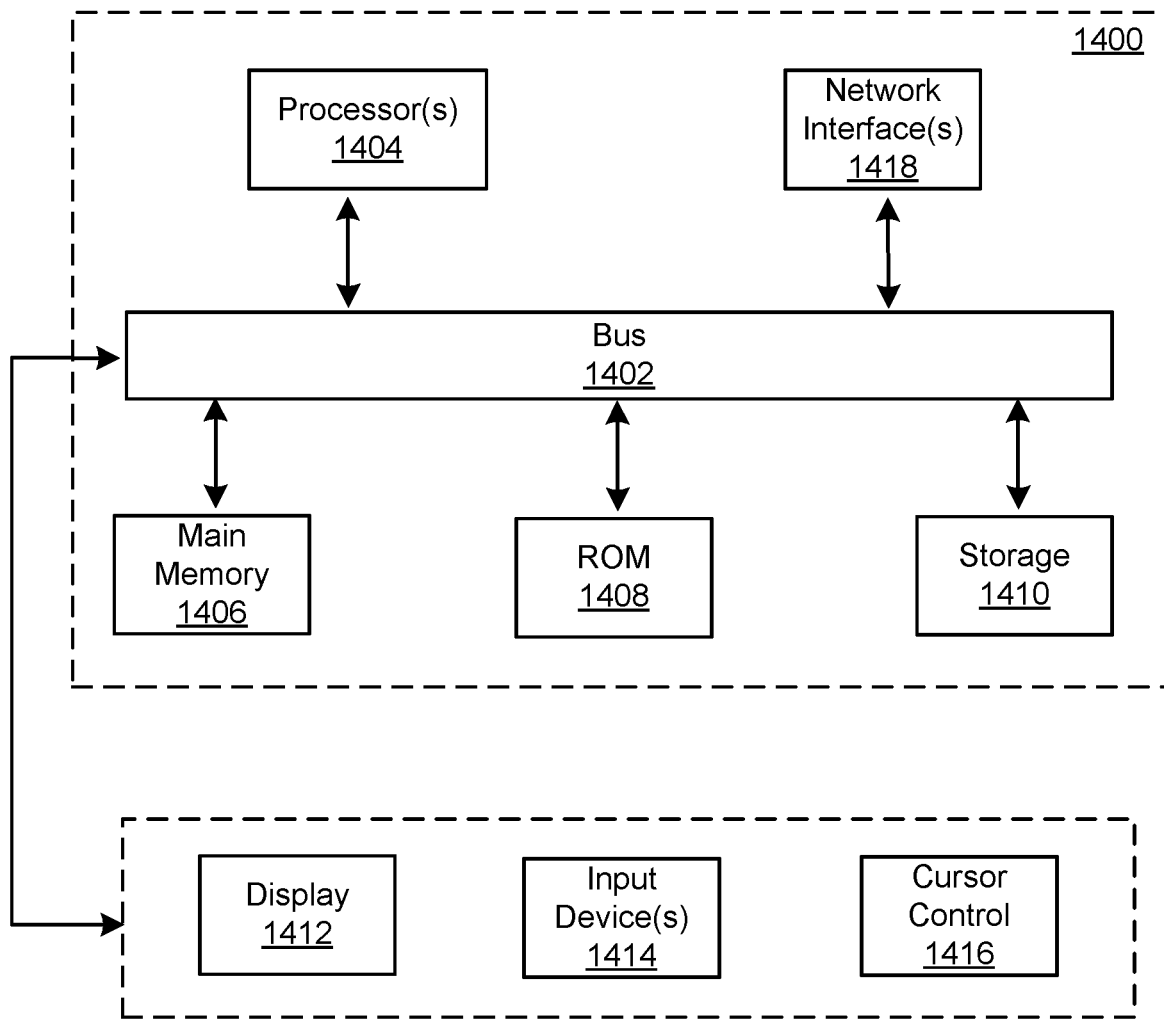
FIG. 14 illustrates a block diagram of an example computer system in which a memristor array may be included for encrypting data.

FIG. 14 depicts a block diagram of an example computer system 1400 in which various of the embodiments described herein may be implemented. Computing system 1400 may include computing component 100. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache, and/or other dynamic storage devices, coupled to bus 1402 for storing information and instructions to be executed by hardware processor 1404. Main memory 1406 may include the memristor arrays by which the encryption of FIGS. 1-13 may be performed. Main memory 1406 may include machine readable storage media 104.

The computer system 1400 further includes a read only memory (ROM) 1408 or other static storage device coupled to bus 1402 for storing static information and instructions for hardware processor 1404. A storage device 1410, such as a magnetic disk, optical disk, or USB thumb drive (Flash drive), etc., is provided and coupled to bus 1402 for storing information and instructions. The thumb drive may include a memristor array that performs the encryption described in FIGS. 1-13.

Computer system 1400 may be, for example, a laptop computer, smart phone, handheld computer, tablet computer, workstation, a server computer, a controller, network device, or any other similar computing component capable of processing data. Computer system 1400 optionally includes a hardware processor 1404, and machine-readable storage medium for 1410. Hardware processor 1404 may fetch, decode, and execute instructions, such as operations 102-1116, for encrypting data with a memristor array.

A machine-readable storage medium, such as machine-readable storage medium 104 may include a memristor array in which values of the computation are stored. The memristors may also be used as compute units for performing computations. Hardware processor 1404 or the memristor array of storage medium 1410 may execute operations 102-116 for encrypting information. The entire encryption process may be performed by the memristor array. Optionally, hardware processor 1404 may complement the memristor array and perform some computations needed for encryption while the memristor array performs other computations.

In some embodiments, machine-readable storage medium 104 may be a non-transitory storage medium, where the term "non-transitory" does not encompass transitory propagating signals.

The computer system 1400 may be coupled via bus 1402 to a display 1412. An input device 1414 is coupled to bus 1402 for communicating information and command selections to hardware processor 1404. Input device 1414 may be used for inputting plain text that is later encrypted using a memristor array. Another type of user input device is cursor control 1416, such as a mouse, a trackball, or cursor direction keys for communicating direction information and command selections to hardware processor 1404 and for controlling cursor movement on display 1412. The computer system 1400 also includes a communication interface 1418 coupled to bus 1402. Network interface 1418 provides a two-way data communication coupling to one or more network links that are connected to one or more local networks. Information that needs to be encrypted or decrypted by the memristor array may be received or sent by network interface 1418 in communication with another device.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements, operations, and/or steps. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of encrypting data, comprising:
   multiplying a first term of a first polynomial representing a first data unit by a first instance of a second polynomial representing a second data unit, resulting in a first resultant polynomial, the first resultant polynomial being represented by a first set of memristors, the first data unit or the second data unit being a data unit of the data being encrypted;
   multiplying a second term of the first polynomial by a second instance of the second polynomial, resulting in a second resultant polynomial, the second resultant polynomial being represented by a second set of memristors; and
   adding the first resultant polynomial to the second resultant polynomial by adding respective currents associated with the first and second sets of memristors.

2. The method of claim 1, further comprising adding an encryption key polynomial representing a data unit of an encryption key to a result of adding the first resultant polynomial to the second resultant polynomial, by adding currents of encryption key polynomial to currents resulting from adding the first resultant polynomial to the second resultant polynomial.

3. The method of claim 1, further comprising:
   receiving an input state;

applying information from a first group of data elements of a data unit to rows of a first group of memristors;
applying information from a second group of data elements of the data unit to columns of the first group of memristors;
the first group of memristors representing a first lookup table of a substitution box, and the applying of the information to the rows and the applying of the information to the columns selects a first coordinate of a location in a substitution box where a replacement value is found for the data unit;
applying the information from the first group of data elements of the data unit to rows of a second group of memristors; and
applying the information from the second group of data elements of the data unit to columns of the second group of memristors;
the second group of memristors representing a second lookup table of the substitution box, and the applying of the information to the rows and the applying of the information to the columns selects a second coordinate of the location in a substitution box where the replacement value is found for the data unit.

4. The method of claim 1, further comprising interpreting a current resulting from adding the first resultant polynomial to the second resultant polynomial as an exclusive OR operation.

5. The method of claim 4, further comprising determining whether a current from the adding causes a threshold corresponding to twice a current representing one bit has been crossed;
if the threshold has been crossed inverting a voltage output to a value corresponding to bit value corresponding to an exclusive OR of two bits.

6. The method of claim 4, the threshold being a first threshold, the method further comprising determining whether the current from the adding causes a second threshold corresponding to three times a current representing one bit to bit crossed;
if the second threshold has been crossed inverting a voltage output to a value corresponding to bit value corresponding to an exclusive OR of the exclusive OR of two bits.

7. The method of claim 1, further the adding the first resultant polynomial to the second resultant polynomial forming a third polynomial,
adding a fourth polynomial to the third polynomial, by adding currents in a memristor array, to form a polynomial with that has the highest power term that is less than a highest power term of the third polynomial.

8. The method of claim 1, wherein the encrypting of the data being performed as a finite element computation.

9. A system comprising:
a set of memristors upon which a method is performed, the method comprising:
encrypting data by:
multiplying a first element of a first data unit by a first instance of a second data unit, resulting in a first resultant data unit, the first resultant data unit being represented by a first set of memristors, the first element of the first data unit representing a multiple of a first power of a base value, the first data unit or the second data unit being a data unit of the data being encrypted;
multiplying a second element of the first data unit by a second instance of the second data unit, resulting in a second resultant data unit, the second data unit being represented by a second set of memristors, the second element of the first data unit representing a multiple a second power of the base value, that is different than the first power of the base value; and
adding the first resultant data unit to the second resultant data unit by adding respective currents associated with the first and second sets of memristors.

10. The system of claim 9 further comprising:
a reference current in parallel with a current resulting from adding the respective currents;
a first threshold device to cause the current resulting from the adding to flow to ground, when the current is above a threshold;
a second threshold device to cause the reference current to flow ground when the resulting from adding is above the threshold; and
an inverter that has a first output and a second output, the first output occurs when the adding respective currents is less than the threshold.

11. The system of claim 10, the second threshold device comprising a field effect transistor having:
a source;
a drain;
a gate connected to a third memristor array and to one of the source and drain; and
another of the source and the drain being connected to ground.

12. The system of claim 11, the first threshold device comprising a field effect transistor having:
a source;
a drain; and
a gate connected to the gate of the first threshold device;
one of the source and the drain of the second threshold device being connected to the reference current; and
another of the source and the drain of the second threshold device being connected to ground.

13. The system of claim 10, the threshold is a first threshold, the system further comprising:
a threshold module associated with a second threshold, the inverter producing the second output when the adding of respective currents is below the second threshold and greater than the first threshold.

14. The system of claim 13, the threshold module being a first threshold module, the system further comprising:
a second threshold module associated with a third threshold, the inverter producing the first output when the adding respective of currents is below a third threshold and greater than the second threshold.

15. The system of claim 14, the inverter producing the first output when the adding of the respective of currents is above the third threshold.

16. A method of encrypting data, comprising:
receiving a first data block, the first data block including a first plurality of data units, each data unit having a different location within the first data block;
substituting data units of a substitution box for the data units of the first data block to form a second block of data, representing the second block by memristors within a first array of memristors; wherein a location of each memristor is arranged to represent rows and columns of an of array data units within the second block of data;
shifting locations of data units along rows of the second data block by shifting positions of values stored by memristors to form a third data block;

multiplying each column of data units of the third data block by a block of data units having fixed values to form a fourth data block;

the multiplying of each column of the data units of the third data block by the block of data units having fixed values being performed by:

multiplying a first element of a first data unit by a first instance of a second a second data unit, resulting in a first resultant data unit, the first resultant data unit being represented by a first set of memristors, the first element of the first data unit representing a multiple of a first power of a base value, one of the first data unit and the second data unit being a data unit of the third block of data and another of the first data unit and the second data unit being a data unit of a block of data units having fixed values;

multiplying a second element of the first data unit by a second instance of the second data unit, resulting in a second resultant data unit, the second data unit being represented by a second set of memristors, the second element of the first data unit representing a multiple of a second power of the base value, the first power and second power being different; and adding the first resultant data unit to the second resultant data unit by adding respective currents associated with the first and second sets of memristors; and adding values of an encryption key to the data units of the third data block by adding currents of memristors representing values of the encryption key with currents of memristors representing the data units of the fourth data block.

17. The method of claim 16, the encrypting of data units of the first data block, based on a substitution box, comprising:

determining a value for a memristor of the memristors representing the second data block, based on a memristor based lookup table.

18. The method of claim 16, the encrypting of data units of the first data block, based on a substitution box, comprising:

encrypting, by a memristor based substitution box, results of the adding of the values of the encryption key to the data units of the fourth data block; and adding results of the encrypting for one data unit to results of the adding of the values of the encryption key of another data unit.

19. The method of claim 17, further comprising:

shifting positions of the data units within a group of data units prior to encrypting a result of the adding of the values of the encryption key to the data units of the fourth data block.

20. The method of claim 16, the memristors representing the data units of the fourth block being arranged in rows and columns;

a given memristor of the data units of the fourth block, being addressable by a signal on a row electrode and a signal on a column electrode, where the given memristor is electrically connected to the column electrode and the row electrode;

the multiplying of the first element of the first data unit by the first instance of the second a second data unit, being performed by shifting memristor values associated with the first instance of the second data unit along a row by a number of positions that is determined by power of the base value of the first element of the first data unit.

* * * * *